United States Patent
Burke et al.

(10) Patent No.: US 7,542,655 B2
(45) Date of Patent: Jun. 2, 2009

(54) SAVING PRESENTED CLIPS OF A PROGRAM

(75) Inventors: Michael Robert Burke, Rochester, MN (US); Frederick Allyn Kulack, Rochester, MN (US); Kevin Glynn Paterson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1041 days.

(21) Appl. No.: 10/879,810

(22) Filed: Jun. 29, 2004

(65) Prior Publication Data

US 2005/0289637 A1  Dec. 29, 2005

(51) Int. Cl.
*H04N 5/91* (2006.01)
*H04N 7/00* (2006.01)
*H04N 7/16* (2006.01)

(52) U.S. Cl. .................. 386/46; 386/68; 725/153
(58) Field of Classification Search .......... None
See application file for complete search history.

(56) References Cited

U.S. PATENT DOCUMENTS

2005/0060741 A1 *  3/2005  Tsutsui et al. ............ 725/32
2006/0184980 A1 *  8/2006  Cole ...................... 725/88
2008/0052739 A1 *  2/2008  Logan ..................... 725/25

OTHER PUBLICATIONS http://www.kuro5hin.org/?op=comments&sid=2001/1/31/18749/1930&pid=39, "Kuro5hin technology and culture, from the trenches", Jun. 29, 2004.
http://ww.panasonic.com/consumer_electronics/dvd_recorder/dvd_recorder.asp, "Panasonic ideas for life", Jun. 29, 2004.
http://www.hotmp3gear.com/files.PDF, "ARCHOS AV300 Series, Audio/Video Editing Instructions Manual Supplement", downloaded Jun. 29, 2004.

* cited by examiner

*Primary Examiner*—Dominic Saltarelli
(74) *Attorney, Agent, or Firm*—Owen J. Gamon

(57) ABSTRACT

A method, apparatus, system, and signal-bearing medium that in an embodiment save presented clips of a program and delete unpresented clips of the program. Meta-data associated with the program or embedded in the program to delineate the presented clips. The meta-data are created in response to commands that cause or end the presentation of the program, such as play, slow motion, skip, fast forward, or rewind commands.

14 Claims, 5 Drawing Sheets

SAVING PRESENTED CLIPS OF A PROGRAM

FIELD

An embodiment of the invention generally relates to digital video recorders. In particular, an embodiment of the invention generally relates to managing the storage space used by programs in a digital video recorder.

BACKGROUND

Television is certainly one of the most influential forces of our time. Through the device called a television set or TV, viewers are able to receive news, sports, entertainment, information, and commercials. A few events stand out as extremely important in the history of television. The invention of the black-and-white TV set and the first broadcasts of television signals in 1939 and 1940 initiated the television age. This was followed by color television and its huge popularity starting in the 1950s. Cable and satellite television began competing with broadcast networks in the 1970s. In this same list must go the development and popularization of the VCR (video cassette recorder) starting in the 1970s and 1980s.

The VCR marks one of the most important events in the history of television because, for the first time, the VCR gave the viewers control of what they could watch on their TV sets and at what time. The VCR spawned the video rental and sales market, and today, VCRs are commonplace.

Now, a new innovation makes recording television programs even more convenient: the digital video recorder, or DVR. The television signal comes into the digital video recorder's built-in tuner through antenna, cable, or satellite. If the signal comes from an analog antenna or cable, it goes into an encoder, which converts the data from analog to digital form. From the encoder, the signal is sent to two different places: first, to an internal hard drive for storage, and second, to a decoder, which converts the signal back to analog and sends it to the television for viewing. For a satellite signal and for cable and antenna signals that are already digital, the encoder is not necessary.

Although the digital video recorder performs much the same functions as a VCR, there are some important differences. First, a digital video recorder is tape-less and has no removable media. With a VCR, the device itself is merely a recording tool; the blank cassette is the removable media. In a digital video recorder, the media and tool are one and the same. This is an advantage because buying and cataloging tapes are unnecessary, but it can also be a disadvantage: since the media is hard-wired internal to the digital video recorder, adding additional storage space is not always possible. Obtaining more recording time is easy with a VCR because the user need only buy another box of blank tapes, which are inexpensive and readily available. In contrast, obtaining additional recording time on a digital video recorder involves buying an entire new machine or purchasing new hardware.

Because recording time on the digital video recorder's internal hard drive is limited, digital video recorders typically cycle through the recorded programs, looking for programs to delete in order to free up space for new recordings. Digital video recorders typically have priority-based rules for selecting which programs to delete. For example, programs that the digital video recorder records automatically based on viewing habits of the user may be deleted first, followed by programs that the user has given low priority. Although deleting programs has the advantage that space is made available for new recordings, it has a significant disadvantage: programs are deleted that a user may want to view or share with others. Further, deleting programs is an all-or-nothing technique, and the user does not have the power to request automatic deleting of only a portion of a program (e.g., unwanted material or objectionable material unsuitable for certain audiences) while keeping other portions of a program that are of interest. Examples of unwanted material may be commercials or items of personal preference, such as the sports but not the weather forecast in a news broadcast.

Without a better way for managing the storage space used by programs, viewers will not be able to take full advantage of all the potential power of a digital video recorder. Although the aforementioned problems have been described in the context of a digital video recorder, they may apply to any electronic device that stores data in a limited storage space.

SUMMARY

A method, apparatus, system, and signal-bearing medium are provided that in an embodiment save presented clips of a program and delete unpresented clips of the program. Meta-data associated with the program or embedded in the program to delineate the presented clips. The meta-data are created in response to commands that cause or end the presentation of the program, such as play, slow motion, skip, fast forward, or rewind commands.

DETAILED DESCRIPTION

In an embodiment, when a user enters a command that requests presentation of a program, start meta-data is created. Examples of such commands are play or slow-motion commands. Likewise, when a user enters a command that requests the presentation to end, end meta-data is created. Examples of such commands are stop, fast forward, rewind, and skip commands. The start and end meta-data delineate the presented clip of the program. The start and end meta-data may then be used to delete the unpresented clips of the program and merge and save the presented clips.

Figure 1:
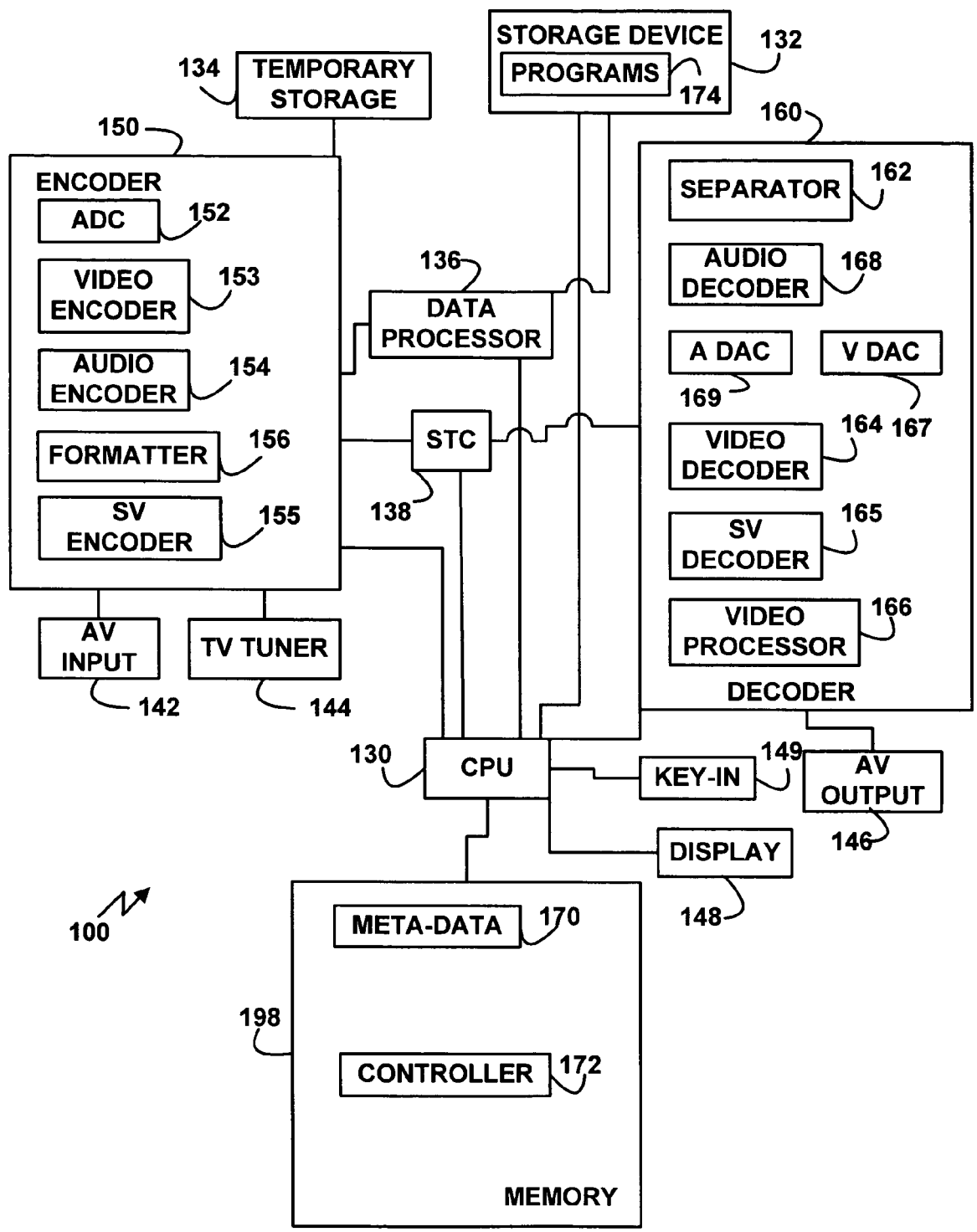
FIG. 1 depicts a block diagram of an example digital video recorder for implementing an embodiment of the invention.

Referring to the Drawing, wherein like numbers denote like parts throughout the several views, FIG. 1 depicts a block diagram of an example digital video recorder 100 used for recording/playing back digital moving image information, according to an embodiment of the invention. The digital video recorder 100 includes a CPU (central processing unit) 130, a storage device 132, temporary storage 134, a data processor 136, a system time counter 138, an audio/video input 142, a TV tuner 144, an audio/video output 146, a display 148, a key-in 149, an encoder 150, a decoder 160, and memory 198.

The CPU 130 may be implemented via a programmable general purpose central processing unit that controls operation of the digital video recorder 100.

The storage device 132 may be implemented by a direct access storage device (DASD), a DVD-RAM, a CD-RW, or any other type of storage device capable of reading and writing data. The storage device 132 stores the programs 174. The programs 174 are data that is capable of being stored and retrieved. In various embodiments, the programs 174 may be television programs, radio programs, movies, video, audio, still images, graphics, or any combination thereof.

The encoder section 150 includes an analog-digital converter 152, a video encoder 153, an audio encoder 154, a sub-video encoder 155, and a formatter 156. The analog-digital converter 152 is supplied with an external analog video signal and an external analog audio signal from the audio-video input 142 or an analog TV signal and an analog voice signal from the TV tuner 144. The analog-digital converter 152 converts an input analog video signal into a digital form. That is, the analog-digital converter 152 quantitizes into digital form a luminance component Y, color difference component Cr (or Y-R), and color difference component Cb (or Y-B). Further, the analog-digital converter 152 converts an input analog audio signal into a digital form.

When an analog video signal and digital audio signal are input to the analog-digital converter 152, the analog-digital converter 152 passes the digital audio signal therethrough as it is. At this time, a process for reducing the jitter attached to the digital signal or a process for changing the sampling rate or quantization bit number may be effected without changing the contents of the digital audio signal. Further, when a digital video signal and digital audio signal are input to the analog-digital converter 152, the analog-digital converter 152 passes the digital video signal and digital audio signal therethrough as they are. The jitter reducing process or sampling rate changing process may be effected without changing the contents of the digital signals.

The digital video signal component from the analog-digital converter 152 is supplied to the formatter 156 via the video encoder 153. The digital audio signal component from the analog-digital converter 152 is supplied to the formatter 156 via the audio encoder 154.

The video encoder 153 converts the input digital video signal into a compressed digital signal at a variable bit rate. For example, the video encoder 153 may implement the MPEG2 or MPEG1 specification, but in other embodiments any appropriate specification may be used.

The audio encoder 154 converts the input digital audio signal into a digital signal (or digital signal of linear PCM (Pulse Code Modulation)) compressed at a fixed bit rate based, e.g., on the MPEG audio or AC-3 specification, but in other embodiments any appropriate specification may be used.

When a video signal is input from the audio-video input 142 or when the video signal is received from the TV tuner 144, the sub-video signal component in the video signal is input to the sub-video encoder 155. The sub-video data input to the sub-video encoder 155 is converted into a preset signal configuration and then supplied to the formatter 156. The formatter 156 performs preset signal processing for the input video signal, audio signal, sub-video signal and outputs record data to the data processor 136.

The temporary storage section 134 buffers a preset amount of data among data (data output from the encoder 150) written into the storage device 132 or buffers a preset amount of data among data (data input to the decoder section 160) played back from the storage device 132. The data processor 136 supplies record data from the encoder section 150 to the storage device 132, extracts a playback signal played back from the storage device 132, rewrites management information recorded on the storage device 132, or deletes data recorded on the storage device 132 according to the control of the CPU 130.

The contents to be notified to the user of the digital video recorder 100 are displayed on the display 148 or are displayed on a TV or monitor (not shown) attached to the audio-video output 146.

The timings at which the CPU 130 controls the storage device 132, data processor 136, encoder 150, and/or decoder 160 are set based on time data from the system time counter 138. The recording/playback operation is normally effected in synchronism with the time clock from the system time counter 138, and other processes may be effected at a timing independent from the system time counter 138.

The decoder 160 includes a separator 162 for separating and extracting each pack from the playback data, a video decoder 164 for decoding main video data separated by the separator 162, a sub-video decoder 165 for decoding sub-video data separated by the separator 162, an audio decoder 168 for decoding audio data separated by the separator 162, and a video processor 166 for combining the sub-video data from the sub-video decoder 165 with the video data from the video decoder 164.

The video digital-analog converter 167 converts a digital video output from the video processor 166 to an analog video signal. The audio digital-analog converter 169 converts a digital audio output from the audio decoder 168 to an analog audio signal. The analog video signal from the video digital-analog converter 167 and the analog audio signal from the audio digital-analog converter 169 are supplied to external components (not shown), which are typically a television set, monitor, or projector, via the audio-video output 146.

Next, the recording process and playback process of the digital video recorder 100 are explained, according to an embodiment of the invention. At the time of data processing for recording, if the user first effects the key-in operation via the key-in 149, the CPU 130 receives a recording instruction for a program and reads out management data from the storage device 132 to determine an area in which video data is recorded. In another embodiment, the CPU 130 determines the program to be recorded.

Then, the CPU 130 sets the determined area in a management area and sets the recording start address of video data on the storage device 132. In this case, the management area specifies the file management section for managing the files, and control information and parameters necessary for the file management section are sequentially recorded.

Next, the CPU 130 resets the time of the system time counter 138. In this example, the system time counter 138 is a timer of the system and the recording/playback operation is effected with the time thereof used as a reference.

The flow of a video signal is as follows. An audio-video signal input from the audio-video input 142 or the TV tuner 144 is A/D converted by the analog-digital converter 152, and the video signal and audio signal are respectively supplied to the video encoder 153 and audio encoder 154, and the closed caption signal from the TV tuner 144 or the text signal of text broadcasting is supplied to the sub-video encoder 155.

The encoders 153, 154, 155 compress the respective input signals to make packets, and the packets are input to the formatter 156. In this case, the encoders 153, 154, 155 determine and record PTS (presentation time stamp), DTS (decode time stamp) of each packet according to the value of the system time counter 138. The formatter 156 sets each input packet data into packs, mixes the packs, and supplies the result of mixing to the data processor 136. The data processor 136 sends the pack data to the storage device 132, which stores it as one of the programs 174.

At the time of playback operation, the user first effects a key-in operation via the key-in 149, and the CPU 130 receives a playback instruction therefrom. Next, the CPU 130 supplies a read instruction and address of the program 174 to be played back to the storage device 132. The storage device 132 reads out sector data according to the supplied instruction and outputs the data in a pack data form to the decoder section 160.

In the decoder section 160, the separator 162 receives the readout pack data, forms the data into a packet form, transfers the video packet data (e.g., MPEG video data) to the video decoder 164, transfers the audio packet data to the audio decoder 168, and transfers the sub-video packet data to the sub-video decoder 165.

After this, the decoders 164, 165, 168 effect the playback processes in synchronism with the values of the PTS of the respective packet data items (output packet data decoded at the timing at which the values of the PTS and system time counter 138 coincide with each other) and supply a moving picture with voice caption to the TV, monitor, or projector (not shown) via the audio-video output 146.

The memory 198 is connected to the CPU 130 and includes the meta-data 170 and the controller 172. The meta-data 170 identify portions of the programs 174 that are to be saved. In another embodiment, the meta-data 170 are embedded in or stored with the programs 174. The meta-data 170 is further described below with reference to FIGS. 3A and 3B.

The controller 172 includes instructions capable of executing on the CPU 130 or statements capable of being interpreted by instructions executing on the CPU 130 to manipulate the meta-data 170 and the programs 174, as further described below with reference to FIGS. 3A and 3B and to perform the functions as further described below with reference to FIGS. 4 and 5. In another embodiment, the controller 172 may be implemented in microcode. In another embodiment, the controller 172 may be implemented in hardware via logic gates and/or other appropriate hardware techniques in lieu of or in addition to a processor-based digital video recorder.

Figure 2:
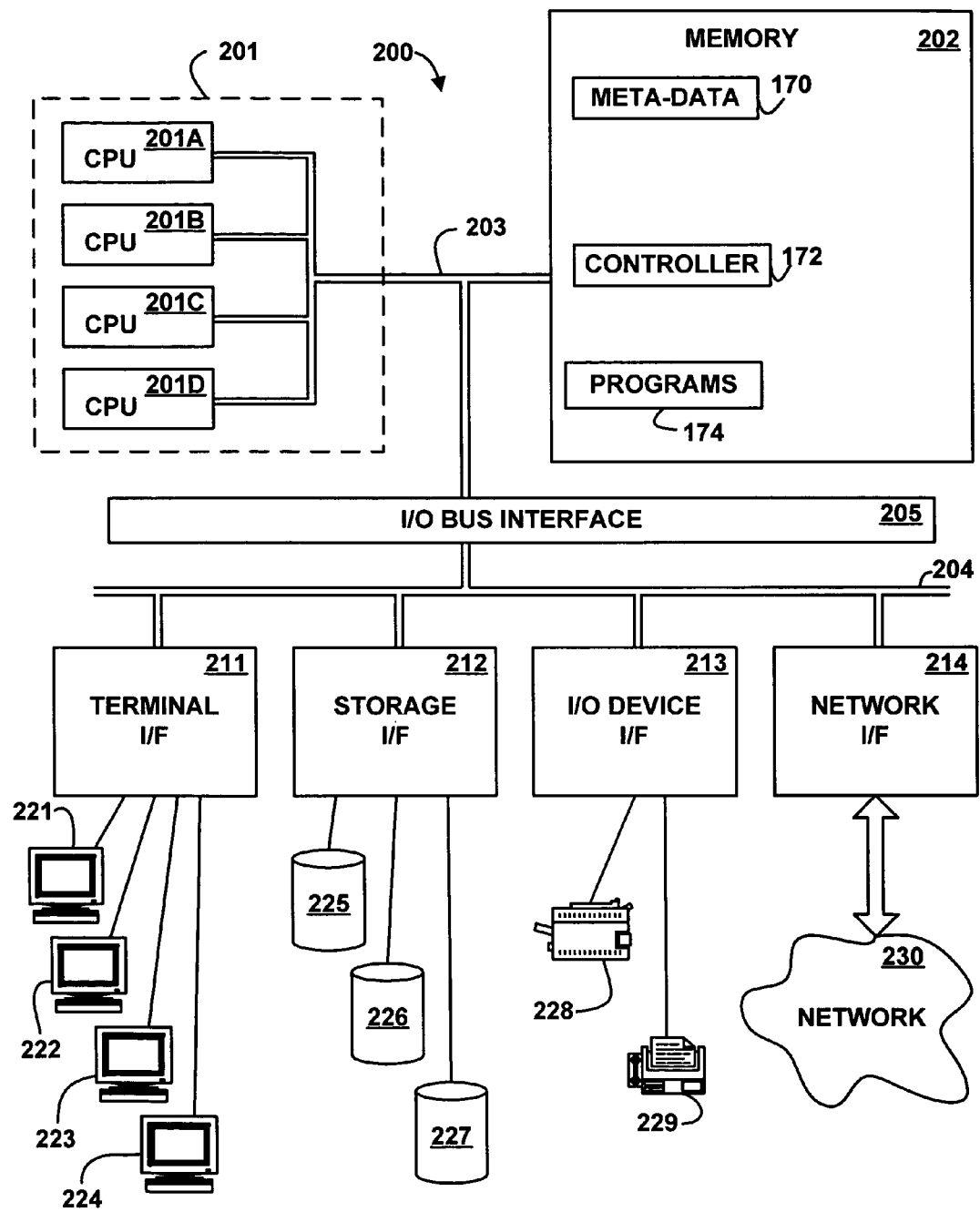
FIG. 2 depicts a block diagram of an example computer system for implementing an embodiment of the invention.

FIG. 2 depicts a high-level block diagram representation of a computer system 200, according to an embodiment of the present invention. The major components of the computer system 200 include one or more processors 201, a main memory 202, a terminal interface 211, a storage interface 212, an I/O (Input/Output) device interface 213, and communications/network interfaces 214, all of which are coupled for inter-component communication via a memory bus 203, an I/O bus 204, and an I/O bus interface unit 205.

The computer system 200 contains one or more general-purpose programmable central processing units (CPUs) 201A, 201B, 201C, and 201D, herein generically referred to as the processor 201. In an embodiment, the computer system 200 contains multiple processors typical of a relatively large system; however, in another embodiment the computer system 200 may alternatively be a single CPU system. Each processor 201 executes instructions stored in the main memory 202 and may include one or more levels of on-board cache.

The main memory 202 is a random-access semiconductor memory for storing data and computer programs. The main memory 202 is conceptually a single monolithic entity, but in other embodiments the main memory 202 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may further be distributed and associated with different CPUs or sets of CPUs, as is known in any of various so-called non-uniform memory access (NUMA) computer architectures.

The memory 202 includes the meta-data 170, the controller 172, and the programs 174. Although the meta-data 170, the controller 172, and the programs 174 are illustrated as being contained within the memory 202 in the computer system 200, in other embodiments some or all may be on different computer systems and may be accessed remotely, e.g., via the network 230. In another embodiment, the meta-data 170 are embedded in or stored with the programs 174. The computer system 200 may use virtual addressing mechanisms that allow the software of the computer system 200 to behave as if it only has access to a large, single storage entity instead of access to multiple, smaller storage entities. Thus, while the meta-data 170, the controller 172, and the programs 174 are illustrated as residing in the memory 202, these elements are not necessarily all completely contained in the same storage device at the same time.

In an embodiment, the controller 172 includes instructions capable of executing on the processors 201 or statements capable of being interpreted by instructions executing on the processors 201 to manipulate the meta-data 170 and the programs 174, as further described below with reference to FIGS. 3A and 3B and to perform the functions as further described below with reference to FIGS. 4 and 5. In another embodiment, the controller 172 may be implemented in microcode. In another embodiment, the controller 172 may be implemented in hardware via logic gates and/or other appropriate hardware techniques in lieu of or in addition to a processor-based system.

The memory bus 203 provides a data communication path for transferring data among the processors 201, the main memory 202, and the I/O bus interface unit 205. The I/O bus interface unit 205 is further coupled to the system I/O bus 204 for transferring data to and from the various I/O units. The I/O bus interface unit 205 communicates with multiple I/O interface units 211, 212, 213, and 214, which are also known as I/O processors (IOPs) or I/O adapters (IOAs), through the system I/O bus 204. The system I/O bus 204 may be, e.g., an industry standard PCI (Peripheral Component Interconnect) bus, or any other appropriate bus technology. The I/O interface units support communication with a variety of storage and I/O devices. For example, the terminal interface unit 211 supports the attachment of one or more user terminals 221, 222, 223, and 224.

Although the memory bus 203 is shown in FIG. 1 as a relatively simple, single bus structure providing a direct communication path among the processors 201, the main memory 202, and the I/O bus interface 205, in another embodiment the memory bus 203 may comprise multiple different buses or communication paths, which may be arranged in any of various forms, such as point-to-point links in hierarchical, star or web configurations, multiple hierarchical buses, parallel and redundant paths, etc. Furthermore, while the I/O bus interface 205 and the I/O bus 204 are shown as single respective units, in other embodiments the computer system 200 may contain multiple I/O bus interface units 205 and/or multiple I/O buses 204. While multiple I/O interface units are shown, which separate the system I/O bus 204 from various communications paths running to the various I/O devices, in other embodiments some or all of the I/O devices are connected directly to one or more system I/O buses.

The storage interface unit 212 supports the attachment of one or more direct access storage devices (DASD) 225, 226, and 227 (which are typically rotating magnetic disk drive storage devices, although they could alternatively be other devices, including arrays of disk drives configured to appear as a single large storage device to a host). The I/O and other device interface 213 provides an interface to any of various other input/output devices or devices of other types. Two such devices, the printer 228 and the fax machine 229, are shown in the exemplary embodiment of FIG. 2, but in other embodiment many other such devices may exist, which may be of differing types. The network interface 214 provides one or more communications paths from the computer system 200 to other digital devices and computer systems; such paths may include, e.g., one or more networks 230.

The network 230 may be any suitable network or combination of networks and may support any appropriate protocol suitable for communication of data and/or code to/from the computer system 200. In an embodiment, the network 230 may represent a television network, whether cable, satellite, or broadcast TV, either analog or digital. In an embodiment, the network 230 may represent a storage device or a combination of storage devices, either connected directly or indirectly to the computer system 200. In an embodiment, the network 230 may support Infiniband. In another embodiment, the network 230 may support wireless communications. In another embodiment, the network 230 may support hardwired communications, such as a telephone line or cable. In another embodiment, the network 230 may support the Ethernet IEEE (Institute of Electrical and Electronics Engineers) 802.3x specification. In another embodiment, the network 230 may be the Internet and may support IP (Internet Protocol). In another embodiment, the network 230 may be a local area network (LAN) or a wide area network (WAN). In another embodiment, the network 230 may be a hotspot service provider network. In another embodiment, the network 230 may be an intranet. In another embodiment, the network 230 may be a GPRS (General Packet Radio Service) network. In another embodiment, the network 230 may be a FRS (Family Radio Service) network. In another embodiment, the network 230 may be any appropriate cellular data network or cell-based radio network technology. In another embodiment, the network 230 may be an IEEE 802.11B wireless network. In still another embodiment, the network 230 may be any suitable network or combination of networks. Although one network 230 is shown, in other embodiments any number of networks (of the same or different types) may be present.

The computer system 200 depicted in FIG. 2 has multiple attached terminals 221, 222, 223, and 224, such as might be typical of a multi-user "mainframe" computer system. Typically, in such a case the actual number of attached devices is greater than those shown in FIG. 2, although the present invention is not limited to systems of any particular size. The computer system 200 may alternatively be a single-user system, typically containing only a single user display and keyboard input, or might be a server or similar device that has little or no direct user interface, but receives requests from other computer systems (clients). In other embodiments, the computer system 200 may be implemented as a personal computer, portable computer, laptop or notebook computer, PDA (Personal Digital Assistant), tablet computer, pocket computer, telephone, pager, automobile, teleconferencing system, video recorder, camcorder, audio recorder, audio player, stereo system, MP3 (MPEG Audio Layer 3) player, digital camera, appliance, or any other appropriate type of electronic device.

It should be understood that FIG. 2 is intended to depict the representative major components of the computer system 200 at a high level, that individual components may have greater complexity that represented in FIG. 2, that components other than, instead of, or in addition to those shown in FIG. 2 may be present, and that the number, type, and configuration of such components may vary. Several particular examples of such additional complexity or additional variations are disclosed herein; it being understood that these are by way of example only and are not necessarily the only such variations.

The various software components illustrated in FIG. 2 and implementing various embodiments of the invention may be implemented in a number of manners, including using various computer software applications, routines, components, programs, objects, modules, data structures, etc., referred to hereinafter as "computer programs." The computer programs typically comprise one or more instructions that are resident at various times in various memory and storage devices in the computer system 200, and that, when read and executed by one or more processors 201 in the computer system 200, cause the computer system 200 to perform the steps necessary to execute steps or elements embodying the various aspects of an embodiment of the invention.

Moreover, while embodiments of the invention have and hereinafter will be described in the context of fully functioning computer systems and digital video recorders, the various embodiments of the invention are capable of being distributed as a program product in a variety of forms, and the invention applies equally regardless of the particular type of signal-bearing medium used to actually carry out the distribution. The programs defining the functions of this embodiment may be delivered to the digital video recorder 100 and/or the computer system 200 via a variety of signal-bearing media, which include, but are not limited to:

(1) information permanently stored on a non-rewriteable storage medium, e.g., a read-only memory device attached to or within a computer system, such as a CD-ROM readable by a CD-ROM drive;

(2) alterable information stored on a rewriteable storage medium, e.g., a hard disk drive (e.g., DASD 225, 226, or 227, the storage device 132, or the memory 198), a CD-RW, or diskette; or (3) information conveyed to the digital video recorder 100 or the computer system 200 by a communications medium, such as through a computer or a telephone network, e.g., the network 230, including wireless communications.

Such signal-bearing media, when carrying machine-readable instructions that direct the functions of the present invention, represent embodiments of the present invention.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIGS. 1 and 2 are not intended to limit the present invention. Indeed, other alternative hardware and/or software environments may be used without departing from the scope of the invention.

Figure 3A:
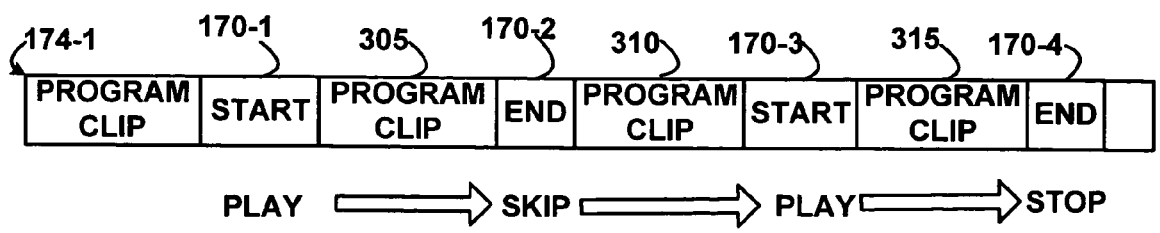
FIG. 3A depicts a block diagram of an example program with meta-data, according to an embodiment of the invention.

FIG. 3A depicts a block diagram of an example program 174-1 with meta-data 170-1, 170-2, 170-3, and 170-4, and program clips 305, 310, and 315, according to an embodiment of the invention. The meta-data 170-1 and the meta-data 170-3 are start meta-data tags. The start meta-data tags 170-1 and 170-3 indicate that the data starting at these points in the program 174-1 have been presented, such as being played, displayed, or performed, e.g., because a play or slow motion operation has started at these points. The meta-data 170-2 and 170-4 are end meta-data tags. The end meta-data tags indicate that the presentation, such as a play, display, or performance of the data in the program 174-1 has ended at these points, e.g., because a stop, rewind, fast forward, or skip operation has begun at these points.

Using the example configuration in FIG. 3A, at the point in the program 174-1 indicated by the start meta-data 170-1, the user requested a play operation, which causes the controller 172 to save the start meta-data 170-1 in the program 174-1. The program clip 305 is then played until an operation occurs that stops the presentation of the clip 305, such as a fast forward or skip operation, which causes the controller to save the end-meta data 170-2 at the point that the presentation ceases. The controller 172 then skips past the program 310, which is not presented to the user. At the point in the program 174-1 indicated by 170-3, the user selects a play operation, which causes the controller 172 to save the start meta-data 170-3 and present the program clip 315. The program clip 315 is presented until the user selects a stop operation, which causes the controller 172 to stop presentation of the program clip 315 and save the end meta-data 170-4 in the program 174-1.

Thus, the start meta-data 170-1 and the end meta-data 170-2 delineate or bound the presented clip 305, and the start meta-data 170-3 and the end meta-data 170-4 delineate the presented clip 315. The clip 310 is unpresented. If response to various requests by the user, the controller 172 may save the program 174-1 including the meta-data 170-1, 170-2, 170-3, and 170-4, may remove the meta-data 170-1, 170-2, 170-3, and 170-4 from the program 174-1, or may save the presented clips 305 and 315 while deleting the unpresented clip 310, as further described below with reference to FIG. 5.

Figure 3B:
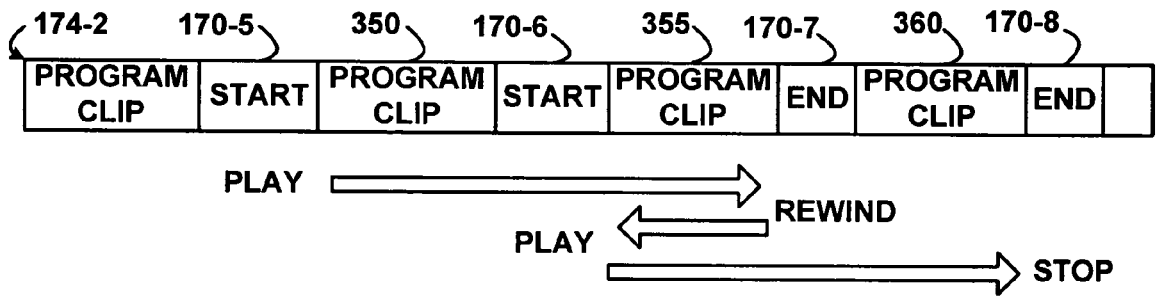
FIG. 3B depicts a block diagram of another example program with meta-data, according to an embodiment of the invention.

FIG. 3B depicts a block diagram of another example program 174-2 with meta-data 170-5, 170-6, 170-7, and 170-8, and clips 350, 355, and 360, according to an embodiment of the invention. The meta-data 170-5 and the meta-data 170-6 are start meta-data tags. The meta-data 170-7 and 170-8 are end meta-data tags. The start meta-data tags 170-5 and 170-6 indicate that the data starting at these points in the program 174-2 has been presented, such as being played, displayed, or performed, e.g., because a play or slow motion operation has started at these points. The meta-data 170-7 and 170-8 are end meta-data tags. The end meta-data tags 170-7 and 170-8 indicate that the presentation, such as a play, display, or performance of the data in the program 174-2 has ended at these points, e.g., because a stop, rewind, fast forward, or skip operation has begun at these points.

Using the example configuration in FIG. 3B, at the point in the program 174-2 indicated by the start meta-data 170-5, the user requested a play operation, which causes the controller 172 to save the start meta-data 170-5 in the program 174-2. The program clips 350 and 355 are then played until an operation occurs that stops the presentation of the clips 350 and 355, such as a rewind operation, which causes the controller 172 to save the end meta-data 170-7 at the point that the presentation ceases.

The controller 172 then starts the rewind (or skip backwards) operation, which skips past the program clip 355, until the user selects a play operation. In response, the controller 172 saves the start meta-data 170-6 in the program 174-2 and presents the program clips 355 and 360 until the user selects a stop operation, which causes the controller 172 to stop presentation of the program clip 360 and to save the end meta-data 170-8 in the program 174-2. Thus, the presented program clips 350, 355 and 360 are bounded by and delineated by the initial start meta-data 170-5 and the meta-data 170-8.

In response to various requests by the user, the controller 172 may save the program 174-2 including the meta-data 170-5, 170-6, 170-7, and 170-8, may remove the meta-data 170-5, 170-6, 170-7, and 170-8 from the program 174-2, or may save the presented clips 350, 355, and 360, as further described below with reference to FIG. 5.

The meta-data 170-1, 170-2, 170-3, 170-4, 170-5, 170-6, 170-7, and 170-8 of FIGS. 3A and 3B, respectively, are generically referred to as the meta-data 170 in FIGS. 1 and 2. The programs 174-1 and 174-2 of FIGS. 3A and 3B, respectively, are generically referred to as the programs 174 in FIGS. 1 and 2. Although the meta-data 170-1, 170-2, 170-3, 170-4, 170-5, 170-6, 170-7, and 170-8 are illustrated in FIGS. 3A and 3B as being imbedded in the programs 174-1 and 174-2, in other embodiments, they may be separate from and point into the programs 174-1 and 174-2, as illustrated in FIGS. 1 and 2.

Figure 4:
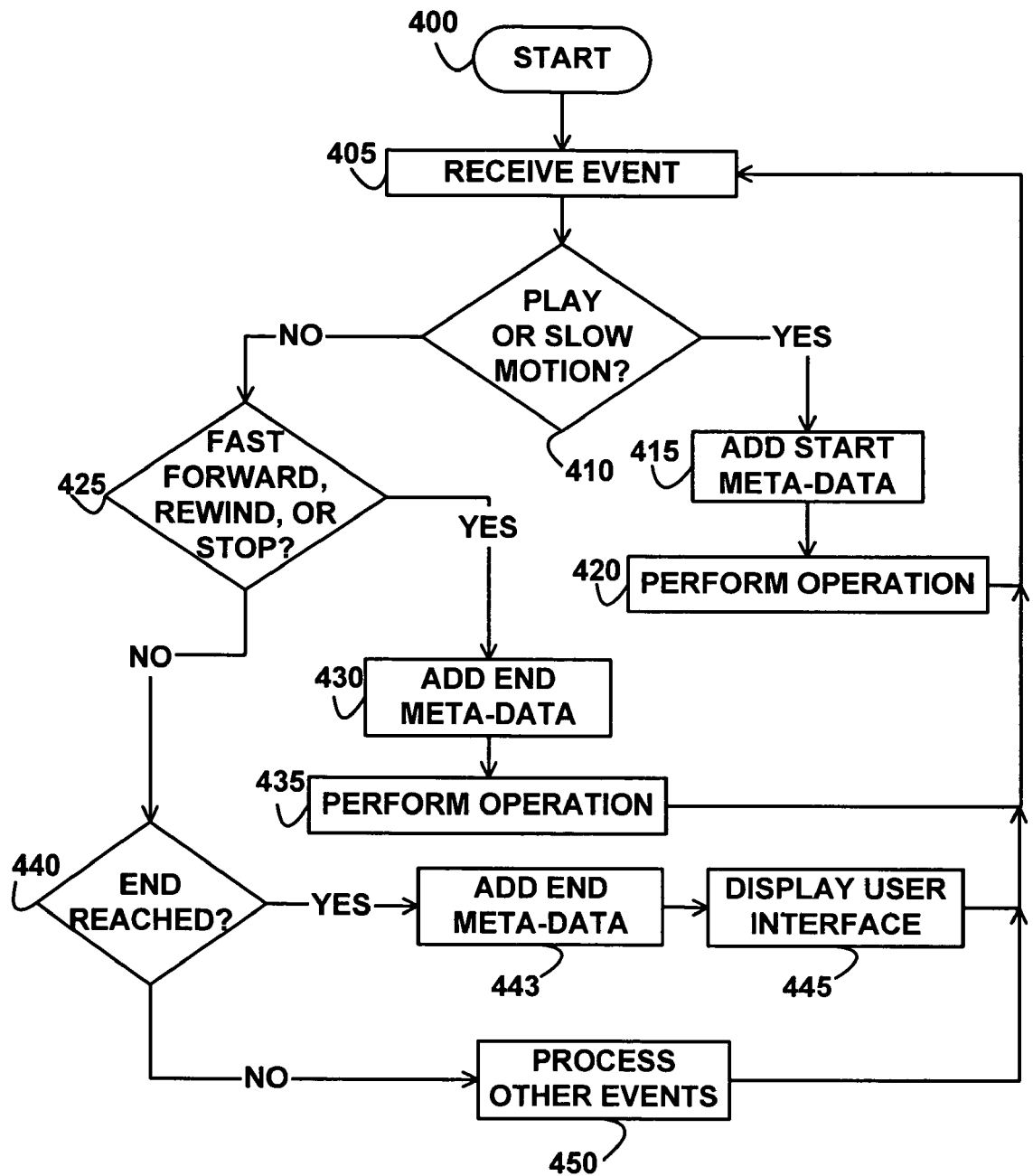
FIG. 4 depicts a flowchart of example processing in a controller for adding meta-data to programs, according to an embodiment of the invention.

FIG. 4 depicts a flowchart of example processing in the controller 172 for adding meta-data to the program 174, according to an embodiment of the invention. Control begins at block 400. Control then continues to block 405 where the controller 172 receives an event. Control then continues to block 410 where the controller 172 determines whether the received event indicates a request for a play or a slow motion operation, e.g., from the key-in 149 in FIG. 1.

If the determination at block 410 is true, then the received event was a request for a play or slow motion operation, so control continues to block 415 where the controller 172 adds start meta-data to the program 174. Control then continues to block 420 where the controller 172 performs the requested play or slow motion operation. Control then returns to block 405, as previously described above.

If the determination at block 410 is false, then the control event was not a play or slow motion operation, so control continues from block 410 to block 425 where the controller 172 determines whether the received event is a skip, fast forward, rewind, or a stop operation subsequent to a play or slow motion operation. If the determination at block 425 is true, then the received event was a skip, fast forward, rewind, or a stop operation subsequent to a play or slow motion operation, so control continues to block 430 where the controller 172 adds end meta-data to the program 174. Control then continues to block 435 where the controller 172 performs the skip, fast forward, rewind, or stop operation. Control then returns to block 405, as previously describe above.

If the determination at block 425 is false, then the received control event was not a fast forward, rewind, or a stop operation subsequent to a play or slow motion operation, so control continues to block 440 where the controller 172 determines whether the received event indicates that the end of the current program 174 has been reached. If the determination at block 440 is true, then the end of the program 174 has been reached, so control continues to block 443 where the controller 172 adds end meta-data to the program 174. Control then continues to block 445 where the controller 172 displays a user interface. The user interface may be displayed, e.g., on the AV output 146, the display 148, or via the displays 221, 222, 223, or 224. The user interface gives the user the opportunity to delete the program 174, to keep the presented content of the program 174, to keep the entire program 174 including the meta-data 170, or to clear the meta-data 170.

If the determination at block 440 is false, then the end of the program 174 was not reached, so control continues to block 450 where the controller 172 processes other events. Control then returns to block 405, as previously described above.

In various embodiments, the controller 172 may ignore multiple events of the same type in succession or return an error.

Figure 5:
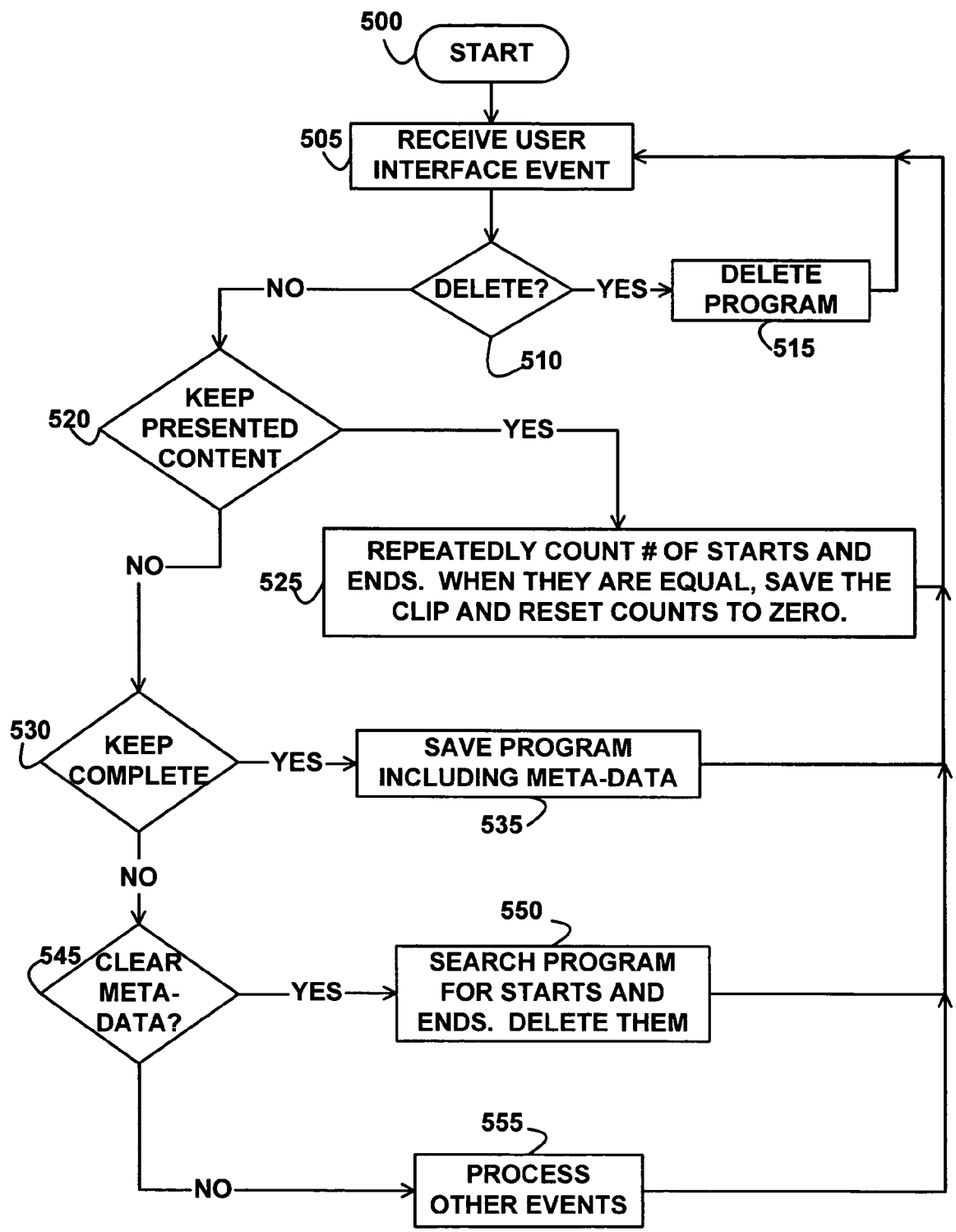
FIG. 5 depicts a flowchart of example processing in a controller for processing meta-data in programs, according to an embodiment of the invention.

FIG. 5 depicts a flowchart of example processing in the controller 172 for processing meta-data in the programs 174, according to an embodiment of the invention. Control begins at block 500. Control then continues to block 505 where the controller 172 receives a user interface event from the user interface that was displayed as previously described above with reference to block 445 of FIG. 4.

Referring again to FIG. 5, control then continues to block 510 where the controller 172 determines whether the received user interface event is a delete command. If the determination at block 510 is true, then the received user interface event is a delete command, so control continues to block 515 where the controller 172 deletes the selected program 174. Control then returns to block 505, as previously described above.

If the determination at block 510 is false, then the received user interface event is not a delete command, so control continues from block 510 to block 520 where the controller 172 determines whether the received user interface event is a keep presented content command.

If the determination at block 520 is true, then the received user interface event is a keep presented content command, so control continues to block 525 where the controller 172 repeatedly searches for meta tags and counts the number of start and end meta-data tags encountered during the search of the program 174. When the number of encountered start meta-data tags equals the number of encountered end-meta-data tags, the controller 172 keeps or saves the clip of material between the first start meta-tag and the final end meta-data tag, resets the counts to zero, and then continues repeatedly searching and counting, starting after the clipped material and its final end meta-data tag. In this way, the controller 172 saves the clips of the program 174 that were presented, performed, or displayed, i.e., the clips that the user had an opportunity to view or hear. The controller 172 then merges the saved clips. Control then returns to block 505, as previously described above.

If the determination at block 520 is false, then the received user interface event is not a keep presented content command, so control continues to block 530 where the controller 172 determines whether the received user interface event is a keep complete command. If the determination at block 530 is true, then the received user interface event is a keep complete command, so control continues to block 535, where the controller 172 saves the program 174 including the meta-data 170. The results of the keep complete, i.e., the program 174 including the meta-data 170, may be viewed and presented later, just as the results of a normal save or keep command may be. In addition, the saved meta-data may be used later as a starting point for a manual editing process.

Control then returns to block 505, as previously described above.

If the determination at block 530 is false, then the received user interface event is not a keep complete command, so control continues to block 545 where the controller 172 determines whether the received user interface event is a clear meta-data command. If the determination at block 545 is true, then the received user interface event is a clear meta-data command, so control continues to block 550 where the controller 172 searches the program 174 for the start and end meta-data and upon finding them, deletes the meta-data. Control then returns to block 505, as previously described above.

If the determination at block 545 is false, then the received user interface event is not a clear meta-data command, so control continues to block 555 where the controller 172 processes other events. Control then returns to block 505, as previously described above.

Although FIG. 5 illustrates the keep complete and keep presented content commands as being mutually exclusive, in other embodiments both of them may be used.

In the previous detailed description of exemplary embodiments of the invention, reference was made to the accompanying drawing (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized, and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of the invention. But, the invention may be practiced without these specific details. In other instances, well-known circuits, structures, and techniques have not been shown in detail in order not to obscure the invention.

What is claimed is:

1. A method comprising:

creating a plurality of start meta-data and a plurality of end meta-data, wherein the respective start meta-data and the respective end meta-data delineate a respective presented clip of a program, wherein the creating the plurality of start meta-data and the plurality of end meta-data further comprises creating a first start meta-data at a first point in the program where a first play operation was started, creating a first end meta-data in the program at a second point in the program where a fast forward command was started, creating a second end meta-data at a third point in the program where a rewind command was started, creating a third end meta-data at a fourth point in the program where a stop command was started, and creating a second start meta-data at a fifth point in the program where a second play operation was started, wherein the fifth point is between the first point and the third point, wherein the first play operation and the second play operation are performed in response to commands that request presentation of the program;

merging and saving the presented clips based on the plurality of start meta-data and the plurality of end meta-data, wherein the merging and saving the presented clips further comprises searching the program for the plurality of start meta-data and the plurality of end meta-data and counting a first number of encountered start meta-data and a second number of encountered end meta-data until the first number equals the second number;

in response to the first number equaling the second number, saving the respective presented clip that is between a first encountered start meta-data and a final encountered end meta-data;

repeating the searching and the saving, starting after the final encountered end meta-data; and deleting unpresented clips based on the plurality of start meta-data and the plurality of end meta-data.

2. The method of claim 1, wherein the creating further comprises:
creating a third start meta-data at a sixth point in the program where a slow-motion operation was stared.

3. The method of claim 2, wherein the program comprises video.

4. The method of claim 2, wherein the program comprises audio.

5. A computer readable storage medium encoded with instructions, wherein the instructions when executed comprise:
creating a plurality of start meta-data and a plurality of end meta-data, wherein the respective start meta-data and the respective end meta-data delineate a respective presented clip of a program, wherein the creating the plurality of start meta-data and the plurality of end meta-data further comprises creating a first start meta-data at a first point in the program where a first play operation was started, creating a first end meta-data in the program at a second point in the program where a fast forward command was started, creating a second end meta-data at a third point in the program where a rewind command was started, creating a third end meta-data at a fourth point in the program where a stop command was started, and creating a second start meta-data at a fifth point in the program where a second play operation was started, wherein the fifth point is between the first point and the third point, wherein the first play operation and the second play operation are performed in response to commands that request presentation of the program;
merging and saving the presented clips based on the plurality of start meta-data and the plurality of end meta-data, wherein the merging and saving the presented clips further comprises searching the program for the plurality of start meta-data and the plurality of end meta-data and counting a first number of encountered start meta-data and a second number of encountered end meta-data until the first number equals the second number;
in response to the first number equaling the second number, saving the respective presented clip that is between a first encountered start meta-data and a final encountered end meta-data;
repeating the searching and the saving, starting after the final encountered end meta-data; and
deleting unpresented clips based on the plurality of start meta-data and the plurality of end meta-data.

6. The storage medium of claim 5, wherein the creating further comprises:
creating a third start meta-data at a sixth point in the program where a slow-motion operation was started.

7. The storage medium of claim 6, wherein the program comprises video.

8. The storage medium of claim 6, wherein the program comprises audio.

9. A digital video recorder comprising:
a processor; and
a memory encoded with instructions, wherein the instructions when executed on the processor comprise:
creating a plurality of start meta-data and a plurality of end meta-data, wherein the respective start meta-data and the respective end meta-data delineate a respective presented clips of a program, wherein the creating the plurality of start meta-data and the plurality of end meta-data further comprises creating a first start meta-data at a first point in the program where a first play operation was started, creating a first end meta-data in the program at a second point in the program where a fast forward command was started, creating a second end meta-data at a third point in the program where a rewind command was started, creating a third end meta-data at a fourth point in the program where a stop command was started, and creating a second start meta-data at a fifth point in the program where a second play operation was started, wherein the fifth point is between the first point and the third point, wherein the first play operation and the second play operation are performed in response to commands that request presentation of the program,
merging and saving the presented clips based on the plurality of start meta-data and the plurality of end meta-data, wherein the merging and saving the presented clips further comprises searching the program for the plurality of start meta-data and the plurality of end meta-data and counting a first number of encountered start meta-data and a second number of encountered end meta-data until the first number equals the second number,
in response to the first number equaling the second number, saving the respective presented clip that is between a first encountered start meta-data and a final encountered end meta-data,
repeating the searching and the saving, starting after the final encountered end meta-data, and
deleting unpresented clips based on the plurality of start meta-data and the plurality of end meta-data.

10. The digital video recorder of claim 9, wherein the creating further comprises:
creating a third start meta-data at a sixth point in the program where a slow-motion operation was started.

11. The digital video recorder of claim 9, wherein the program comprises video.

12. A computer system comprising:
a processor; and
a memory encoded with instructions, wherein the instructions when executed on the processor comprise:
creating a plurality of start meta-data and a plurality of end meta-data, wherein the respective start meta-data and the respective end meta-data delineate presented clips of a program, wherein the creating the plurality of start meta-data and the plurality of end meta-data further comprises creating a first start meta-data at a first point in the program where a first play operation was started, creating a first end meta-data in the program at a second point in the program where a fast forward command was started, creating a second end meta-data at a third point in the program where a rewind command was started, creating a third end meta-data at a fourth point in the program where a stop command was started, and creating a second start meta-data at a fifth point in the program where a second play operation was started, wherein the fifth point is between the first point and the third point, wherein the first play operation and the second play operation are performed in response to commands that request presentation of the program,
merging and saving the presented clips based on the plurality of start meta-data and the plurality of end meta-data, wherein the merging and saving the presented clips further comprises searching the program for the plurality of start meta-data and the plurality of end meta-data and counting a first number of encountered start meta-data and a second number of encountered end meta-data until the first number equals the second number, in response to the first number equaling the second number, saving the respective presented clip that is between a first encountered start meta-data and a final encountered end meta-data, repeating the searching and the saving, starting after the final encountered end meta-data, and deleting unpresented clips based on the plurality of start meta-data and the plurality of end meta-data.

13. The computer system of claim 12, wherein the creating further comprises:

creating a third start meta-data at a sixth point in the program where a slow-motion operation was started.

14. The computer system of claim 12, wherein the program comprises video.

* * * * *